US012699785B1

(12) United States Patent (10) Patent No.: US 12,699,785 B1
Zou (45) Date of Patent: Aug. 4, 2026

(54) SYSTEM AND METHOD FOR PRIVACY-PRESERVING AUDIO-VISUAL PROCESSING

(71) Applicant: Leopard Imaging Inc., Fremont, CA (US)

(72) Inventor: Yongning Zou, Fremont, CA (US)

(73) Assignee: Leopard Imaging Inc., Fremont, CA (US)

( * ) Notice: Subject to any disclaimer, the term of this patent is extended or adjusted under 35 U.S.C. 154(b) by 0 days.

(21) Appl. No.: 19/416,422

(22) Filed: Dec. 11, 2025

Related U.S. Application Data

(63) Continuation of application No. 19/330,389, filed on Sep. 16, 2025, now abandoned.

(60) Provisional application No. 63/817,938, filed on Jun. 4, 2025.

(51) Int. Cl.
*G06F 21/60* (2013.01)
*G06V 10/77* (2022.01)
*G06V 20/40* (2022.01)

(52) U.S. Cl.
CPC ........ *G06F 21/602* (2013.01); *G06V 10/7715* (2022.01); *G06V 20/46* (2022.01)

(58) Field of Classification Search
CPC .... G06F 21/6254; G06V 10/82; G06V 20/46; G06V 10/7715
See application file for complete search history.

(56) References Cited

U.S. PATENT DOCUMENTS

| | | | | |
|---|---|---|---|---|
| 10,372,991 | B1 * | 8/2019 | Niemasik | G06F 16/683 |
| 10,535,120 | B2 * | 1/2020 | Edwards | G06N 3/088 |
| 10,755,171 | B1 | 8/2020 | Sharifi et al. | |
| 10,834,363 | B1 * | 11/2020 | Zhang | H04N 7/181 |
| 10,860,865 | B2 | 12/2020 | Hollander et al. | |
| 11,163,860 | B2 * | 11/2021 | Gu | G06N 3/08 |
| 11,170,793 | B2 | 11/2021 | Jin et al. | |
| 11,520,923 | B2 | 12/2022 | Sohn et al. | |
| 11,734,570 | B1 | 8/2023 | Kurz et al. | |
| 11,763,832 | B2 * | 9/2023 | Nesta | G06N 3/088 |
| | | | | 704/232 |
| 11,797,835 | B2 | 10/2023 | Dalli et al. | |
| 12,001,950 | B2 | 6/2024 | Zhang et al. | |
| 12,125,317 | B2 | 10/2024 | Lee et al. | |
| 12,148,214 | B2 | 11/2024 | Cheng et al. | |
| 12,272,377 | B2 | 4/2025 | Shiloh Perl et al. | |

(Continued)

*Primary Examiner* — Lizbeth Torres-Diaz
(74) *Attorney, Agent, or Firm* — Treasure IP Group, LLC

(57) ABSTRACT

The present invention describes a privacy-preserving audio-visual (AV) processing system. The system is configured to transform raw AV data into non-reconstructable embeddings in real-time, immediately discarding the original sensitive data within milliseconds. This process enables AI-based event analysis solely on these secure embeddings, significantly mitigating privacy risks associated with traditional surveillance. Furthermore, the system incorporates a cryptographically auditable override mechanism, allowing authorized temporary access to buffered raw data, with all such events immutably logged, often via blockchain technology, ensuring accountability and regulatory compliance. The innovation's value is emphasized through its unique combination of these existing technologies, making it particularly suitable for sensitive environments like healthcare facilities and private homes where strict privacy is paramount.

24 Claims, 8 Drawing Sheets

(56)          References Cited

U.S. PATENT DOCUMENTS

| | | | |
|---|---|---|---|
| 12,335,379 B1 | 6/2025 | Dahme et al. | |
| 2013/0191631 A1* | 7/2013 | Ylonen | H04L 63/164 |
| | | | 713/153 |
| 2017/0178346 A1 | 6/2017 | Ferro et al. | |
| 2021/0334645 A1 | 10/2021 | Pardeshi et al. | |
| 2022/0245426 A1* | 8/2022 | Branco | G06N 3/044 |
| 2022/0286438 A1 | 9/2022 | Burke, Jr. et al. | |
| 2022/0309343 A1 | 9/2022 | Elkhatib et al. | |
| 2023/0162040 A1 | 5/2023 | Clement et al. | |
| 2023/0306258 A1* | 9/2023 | Assael | G06N 3/0464 |
| 2023/0409749 A1 | 12/2023 | Li et al. | |
| 2024/0095498 A1 | 3/2024 | Choque et al. | |
| 2024/0211734 A1 | 6/2024 | Rohwer | |
| 2024/0233709 A1* | 7/2024 | Phatak | G06N 3/045 |
| 2025/0124274 A1 | 4/2025 | Pierquin et al. | |
| 2025/0201019 A1* | 6/2025 | Sepas-Moghaddam | |
| | | | G06V 40/172 |

* cited by examiner

SYSTEM AND METHOD FOR PRIVACY-PRESERVING AUDIO-VISUAL PROCESSING

CROSS-REFERENCE TO RELATED APPLICATIONS

This application claims priority to U.S. Provisional Patent Application No. 63/817,938, filed Jun. 4, 2025, titled "Audio-Visual Steganographic Embedding Layer for Privacy-Aware Surveillance Systems," the entire contents of which are incorporated herein by reference in its entirety.

FIELD OF THE INVENTION

The invention relates to privacy-preserving audio-visual systems, specifically systems and methods that transform raw audio and video signals into non-reconstructable embeddings for secure event detection, anomaly classification, and behavior monitoring, while enforcing raw data disposal and permitting auditable overrides.

BACKGROUND

Conventional audio-visual surveillance systems typically capture and store raw content, which creates significant privacy risks and regulatory compliance challenges under frameworks such as HIPAA, GDPR, FERPA, and CCPA. While some existing solutions implement transformation of video data at the sensor level, such approaches remain limited in that they continue to store raw data, do not extend protections to audio signals, and fail to provide policy-based override mechanisms coupled with cryptographic audit trails.

Accordingly, existing technologies do not adequately combine real-time audio and visual analysis with enforced raw data discard and tamper-proof logging unit. This deficiency is particularly problematic in privacy-critical environments such as elder care facilities, mental health centers, hospitals, and private residences; classrooms, corporate boardrooms, and retail establishments; public transportation systems, driver monitoring systems, and smart city pedestrian monitoring; and factory, warehouse, and home robotics.

In view of the foregoing, there is a need for audio and visual systems that transform raw signals into non-reconstructable embeddings while enforcing raw data discard and supporting auditable policy-based overrides for secure, privacy-preserving event detection, anomaly classification, and behavior monitoring.

SUMMARY OF THE INVENTION

The present invention provides a system and method for privacy-preserving audio-visual processing by transforming raw audio-visual signals into non-reconstructable multimodal embeddings, discarding raw data unless a policy-based override is triggered.

It is one fundamental object of the present invention to move away from the conventional paradigm of collecting and transmitting raw audio and video data—an approach inherently fraught with privacy risks from leakage, unauthorized access, or misuse—and instead establish a new framework where only privacy-preserving, non-reconstructable multimodal embeddings are utilized, rendering raw data unnecessary except under controlled, policy-driven exceptions.

It is another object of the present invention to prevent any reconstruction of raw audio and visual signals from its generated embeddings, thereby ensuring that even in the event of data leakage, the embeddings cannot expose sensitive content—offering users safety, privacy, and peace of mind against unauthorized access or misuse.

It is still another object of the present invention, to ensure auditability through a robust cryptographic logging unit system that records all override events in a tamper-proof manner, ensuring accountability and transparency.

On a first aspect of the present invention, a method for Privacy-Preserving Audio-Visual Processing is disclosed. The method comprises capturing, via at least one sensor, a stream of raw data, wherein the sensor is connected to a local computing device;

processing the stream of raw data using an on-device embedding model to generate one or more non-reversible, task-specific multimodal embeddings, said one or more embeddings are abstract representations of features within the raw audio-visual data and are incapable of being used to reconstruct the raw audio-visual data; said one or more embeddings comprises pattern recognition-feature vectors;

disposing the raw audio-visual data to a secure, short-term ring buffer memory of the computing device; based on a first policy, automatically discarding the raw audio and visual data from the ring buffer memory within 400 to 800 milliseconds of capture;

retaining the one or more non-reversible embeddings in a non-transitory computer-readable medium after the raw audio-visual data has been discarded;

receiving an override trigger signal from an override component; in response to receiving the override trigger signal, suspending the first policy to allow controlled access to the raw audio and visual data stored in the ring buffer memory; and generating a cryptographically signed audit log entry documenting the override trigger signal and the controlled access to the raw audio-visual data.

In certain embodiments, the method further comprises processing the multimodal embeddings to detect events in a privacy-critical environment, including elder care, mental health monitoring, or private settings.

In further embodiments, the method comprises transmitting the one or more non-reversible embeddings to a remote system for federated learning or inference; wherein no raw audio and visual data is transmitted from the computing device and performing federated inference across edge nodes using only the multimodal embeddings.

In some embodiments, the method further comprises receiving an authenticated override trigger, including at least one of a gesture, a voice command, or an authenticated API call, to permit temporary storage of raw audio and video signals in an encrypted buffer, wherein authentication of the override trigger is verified through a hardware-based mechanism.

In additional embodiments, the method comprises enforcing the first policy by a policy engine executed by a secure enclave or Trusted Platform Module (TPM) of the computing device.

In yet further embodiments, the method comprises automatically discarding the raw audio and visual data is enforced by a watchdog service monitoring a timed buffer, wherein the watchdog service is linked to a hardware component of the computing device.

In still further embodiments, the method comprises applying a privacy-enhancing technique to the one or more non-reversible embeddings prior to retention, wherein the privacy-enhancing technique comprises at least one of: cryptographic hashing or injection of differential privacy noise.

In other embodiments, the method is characterized by the cryptographically signed audit log entry being stored in an immutable data structure.

In other embodiments, the method is characterized by encrypting the raw audio-visual data stored in the ring buffer memory using a key managed by a secure enclave or Trusted Platform Module (TPM) of the computing device.

In still other embodiments, the method comprises detecting events that include multimodal indicators, such as sudden loud audio patterns combined with rapid visual motion.

In yet other embodiments, the method is characterized by the one or more non-reversible, task-specific embeddings, comprising one or more of: an intent embedding, an emotion embedding, an audio event embedding, or a visual event embedding, wherein transforming the raw audio and video signals includes generating a joint embedding vector using a time-aligned fusion layer with attention mechanisms.

On a second aspect of the present invention, a system for privacy-preserving processing of audio-visual data is provided. The system comprises at least one processor of a computing device and a non-transitory computer-readable storage medium comprising instructions that, when executed by the at least one processor, cause the system to:

capture, via at least one sensor, a stream of raw audio-visual data;

process the stream of raw audio-visual data using an on-device embedding model to generate one or more non-reversible, task-specific embeddings, wherein the embeddings are abstract feature representations incapable of reconstructing the raw audio-visual data;

store the raw audio-visual data in a secure, short-term ring buffer memory;

based on a first policy, automatically discard the raw audio-visual data from the ring buffer memory within a configurable discard delay;

retain the one or more non-reversible embeddings after the raw audio-visual data has been discarded;

receive an override trigger signal from an override component;

in response to receiving the override trigger signal, suspend the first policy to permit controlled access to the raw audio-visual data stored in the ring buffer memory; and generate a cryptographically signed audit log entry documenting the override trigger signal and the controlled access to the raw audio-visual data.

In certain embodiments, the configurable discard delay is between 400 and 800 milliseconds.

In further embodiments, the first policy is enforced by a policy engine executed within a secure enclave or Trusted Platform Module (TPM) of the computing device, thereby ensuring hardware-rooted trust in the discard and retention operations.

In some embodiments, automatic discarding of the raw audio-visual data is enforced by a watchdog service monitoring a timed buffer, the watchdog service being linked to a hardware component of the computing device.

In additional embodiments, the at least one sensor comprises an audio-visual input device including at least one of an RGB camera, a stereo camera, a near-infrared sensor, a thermal imager, or a microphone array. The RGB camera may be used in a retail store use case, the near-infrared sensor may be used in a hospital room, and the thermal imager may be used in a low-light industrial setting.

In yet further embodiments, the on-device embedding model comprises a deep-learning architecture including at least one of a convolutional neural network (CNN), a Vision Transformer (ViT), or a hybrid CNN-RNN architecture.

In still further embodiments, in one instance, the one or more non-reversible embeddings comprise one or more of: an intent embedding, an emotion embedding, an audio event embedding, or a visual event embedding. In another instance, processing the stream of the raw audio and video data comprising generating a joint embedding vector using a time-aligned fusion layer with attention mechanisms.

In other embodiments, the system further applies a privacy-enhancing technique to the one or more non-reversible embeddings, wherein the privacy-enhancing technique comprises at least one of: a cryptographic hash function or differential privacy noise injection.

In still other embodiments, the system processes the embeddings to detect events in a privacy-critical environment, including elder care, mental health monitoring, or private settings.

In yet other embodiments, the privacy-critical environment comprises an elder care facility, and the event detection includes at least one of: fall detection, repetitive behavior detection, or verbal distress detection. Similar, for a classroom including minors, the event detection includes at least one of: detect behavior patterns indicative of bullying or student disengagement.

In other embodiments, the system performs federated learning or inference by transmitting the one or more non-reversible embeddings to a remote system, wherein no raw audio-visual data is transmitted from the computing device, and wherein federated inference is performed across edge nodes using only the multimodal embeddings.

In still other embodiments, the cryptographically signed audit log entry is stored in an immutable data structure, including at least one of: a Merkle tree or a blockchain ledger, thereby ensuring tamper-evidence.

In yet other embodiments, the at least one processor is implemented on an edge computing platform including an NVIDIA Jetson platform, a field-programmable gate array (FPGA), or a system-on-chip (SoC).

In one example, the system comprises the Embedding Generator, Discard Controller, Override Engine, Cryptographic Logging unit, Analysis Module.

BRIEF DESCRIPTION OF DRAWINGS

It will be appreciated that the drawings are provided for purposes of illustration and not limitation. Like reference numerals in the drawings refer to like elements throughout the several views. The figures are intended to illustrate representative embodiments of the present invention, and no particular embodiment should be construed as limiting the scope of the invention. Variations and modifications, as described herein, may be implemented without departing from the inventive concepts disclosed.

5

Figure 1:
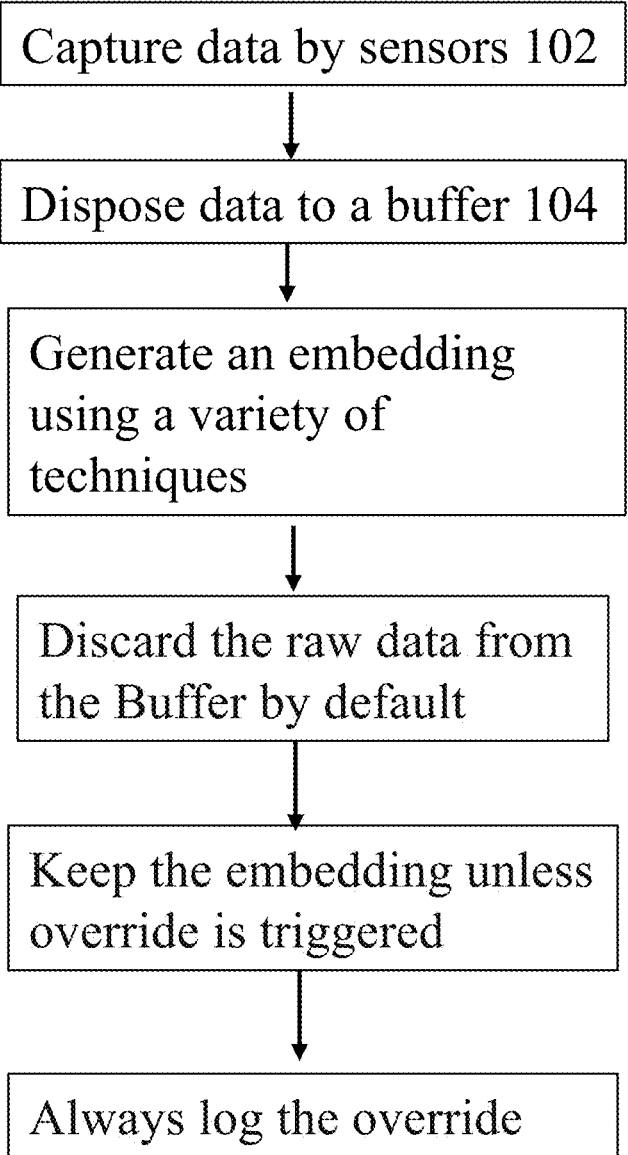
FIG. 1 is a schematic illustration of operation steps of the Privacy-Preserving Audio-Visual processing system showing an embodiment of the present invention, wherein the embedding and discard process and raw audio and visual signal transformation and override logic are illustrated in accordance with the aspect of the present invention.
Figure 2:
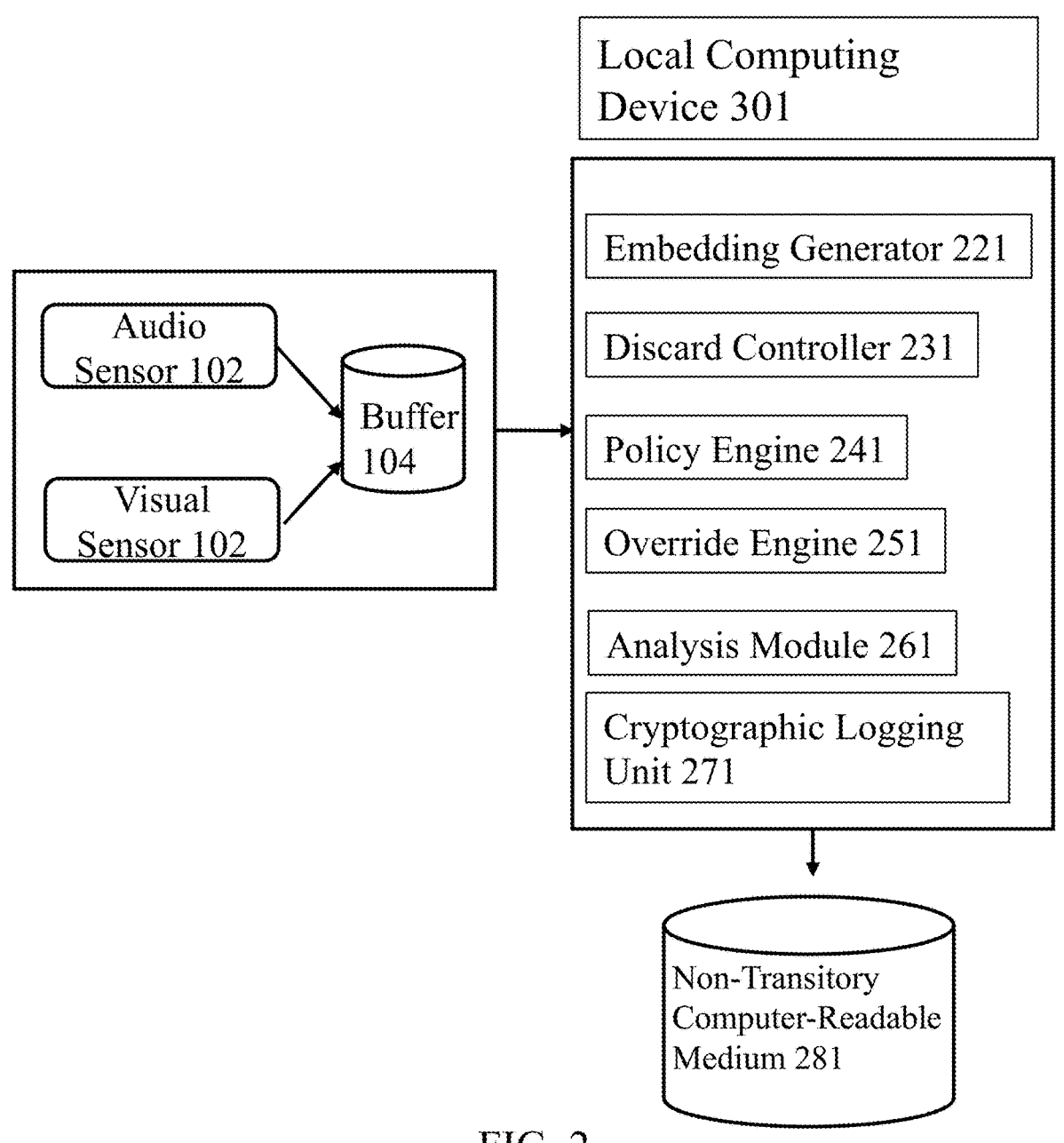
FIG. 2 is a schematic illustration of the system for Privacy-Preserving Audio-Visual processing and data flow chart in accordance with the aspects of the present invention.
Figure 3:
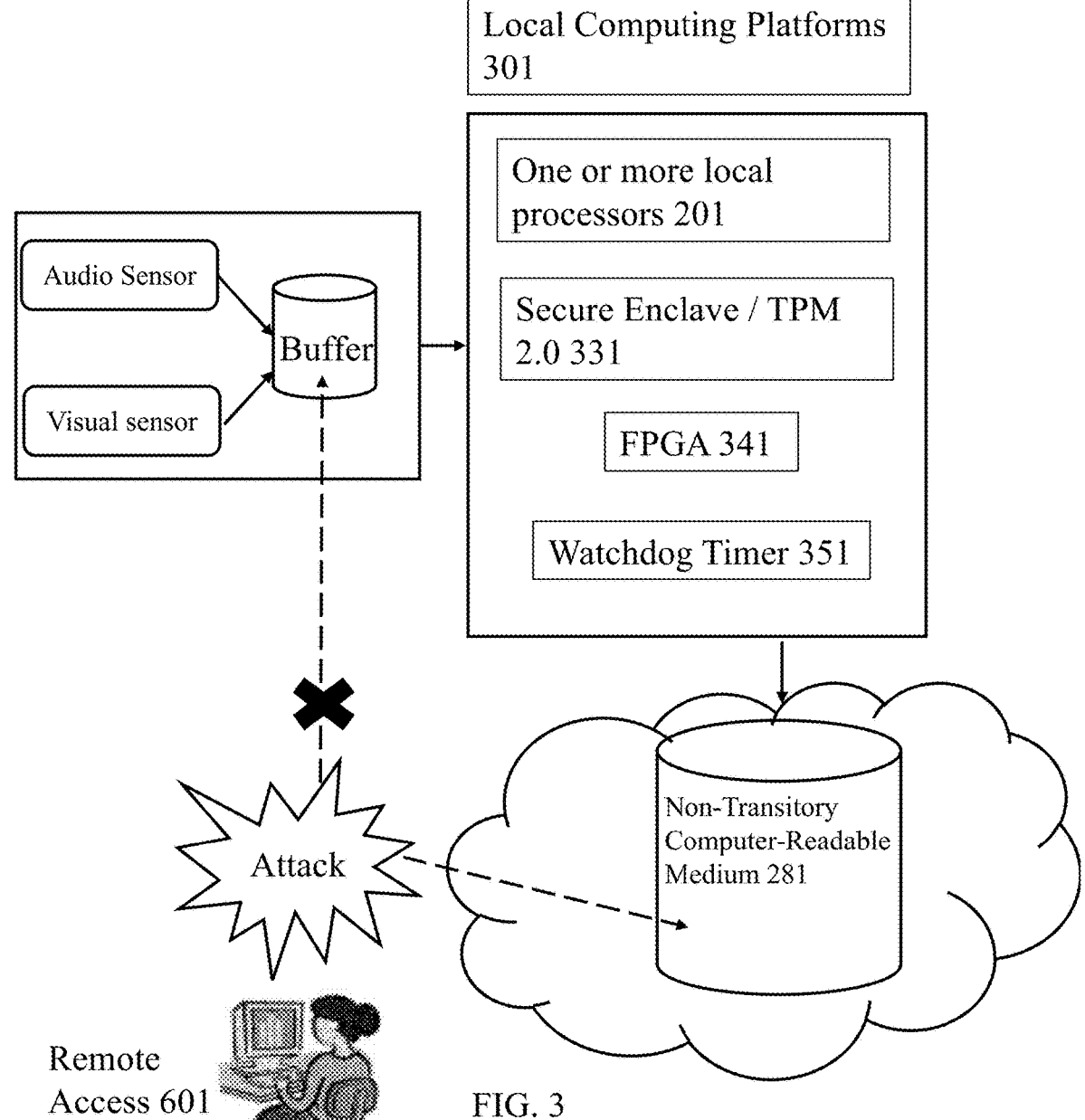

FIG. 3 is schematic illustration of the additional components and data flow steps that provide additional security to privacy and prevent data leak.

Figure 4:
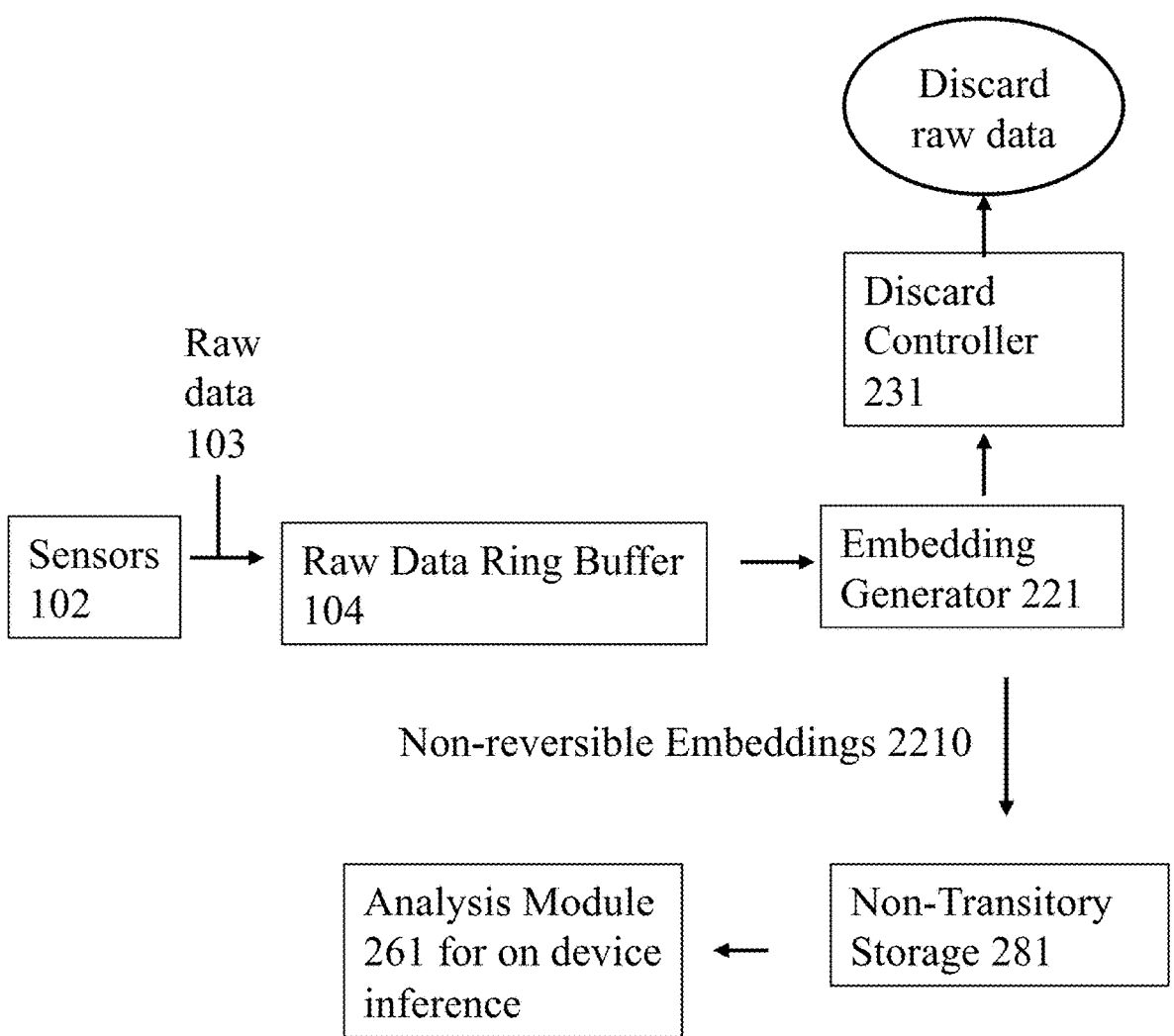

FIG. 4 is a schematic illustration of one embodiment method of the present invention.

Figure 5:
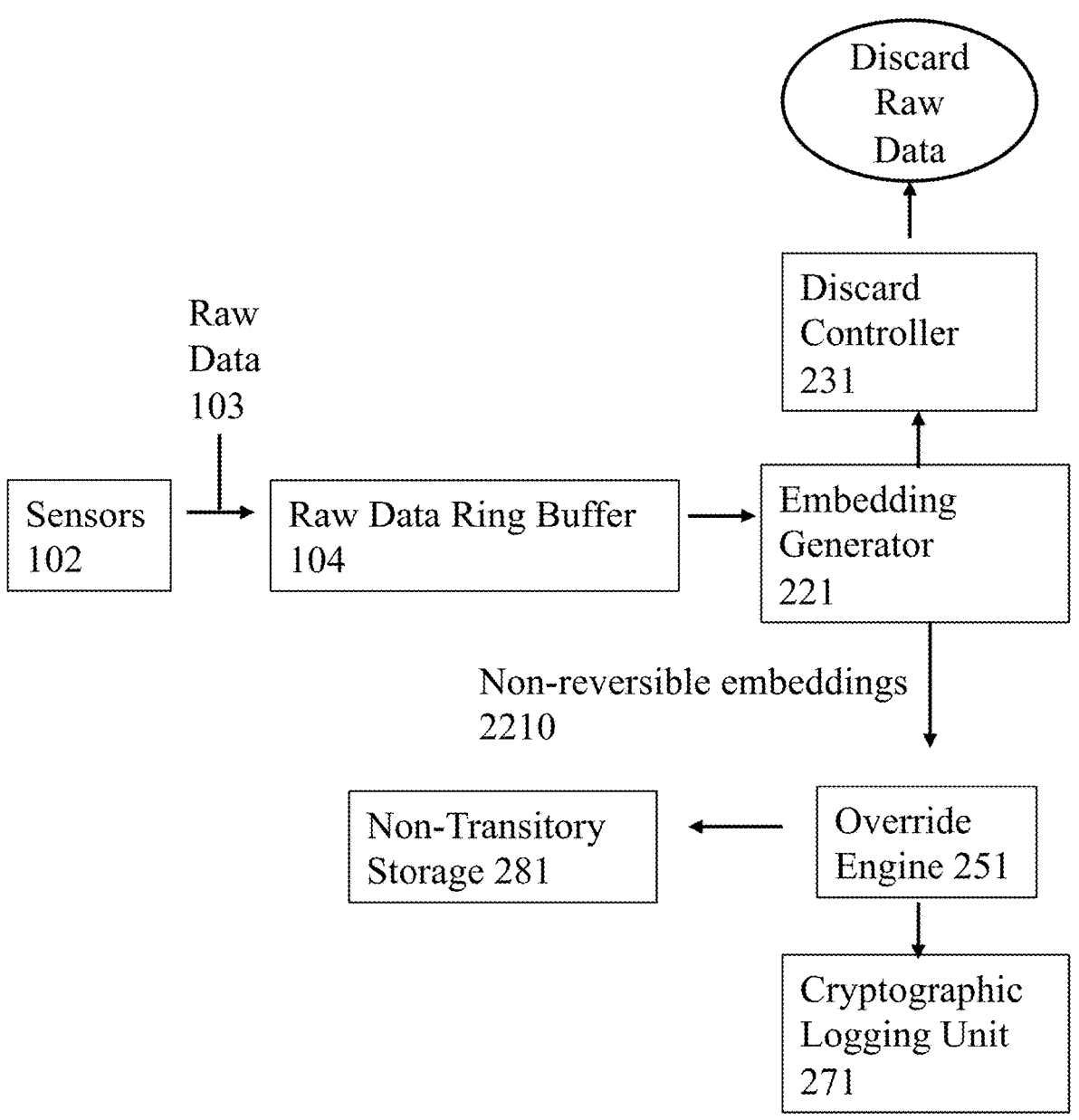

FIG. 5 is a schematic illustration of another embodiment method of the present invention.

Figure 6:
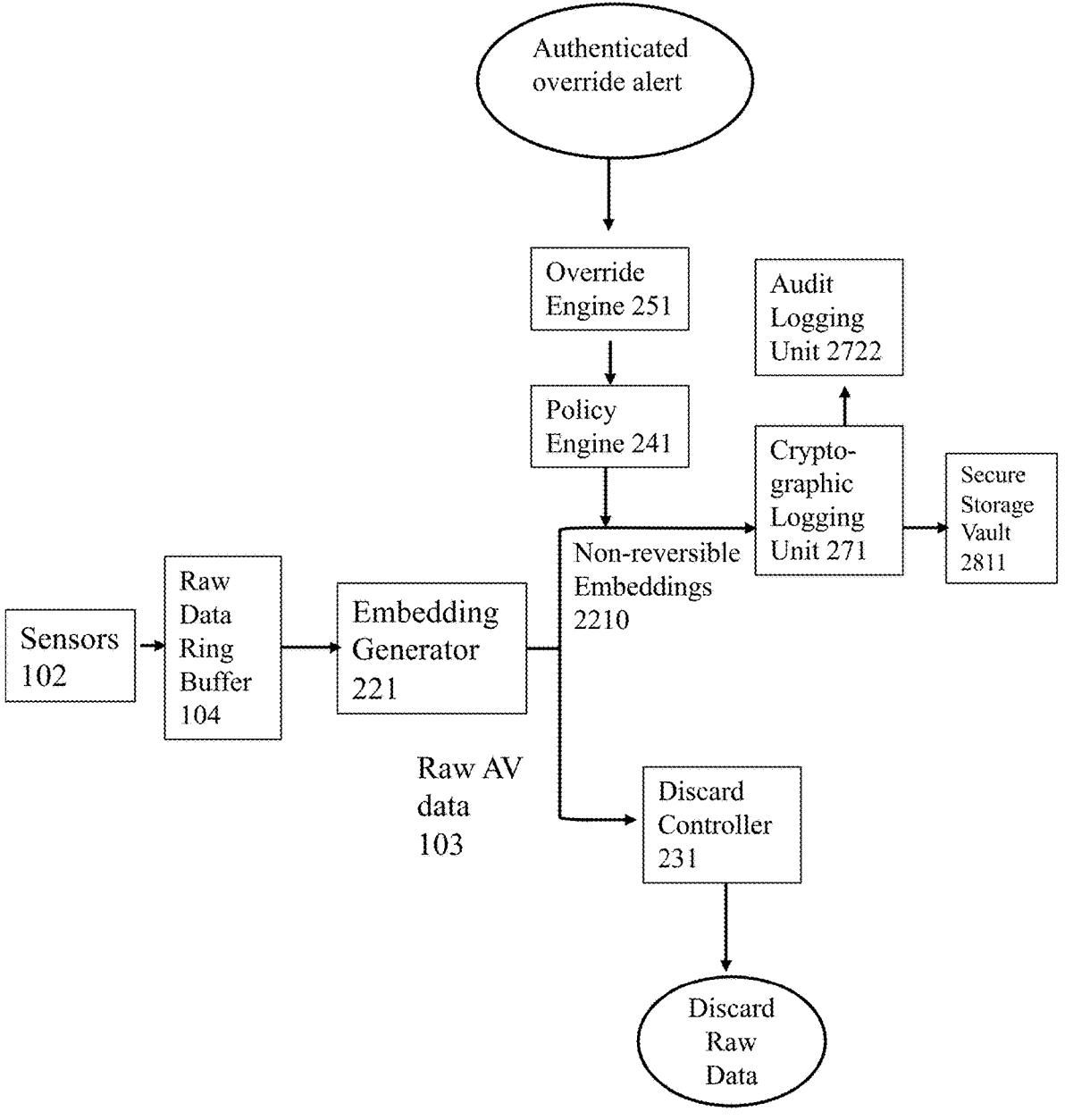

FIG. 6 is a schematic illustration of yet another embodiment method of the present invention.

Figure 7:
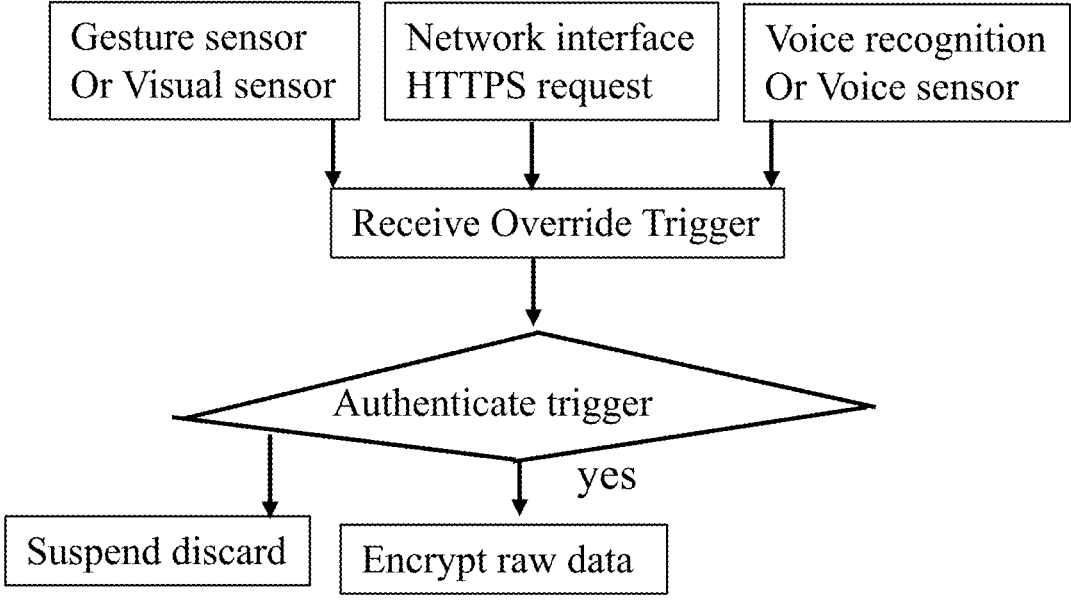

FIG. 7 is a schematic illustration of one embodiment method step of trigger and authenticate override request.

Figure 8:
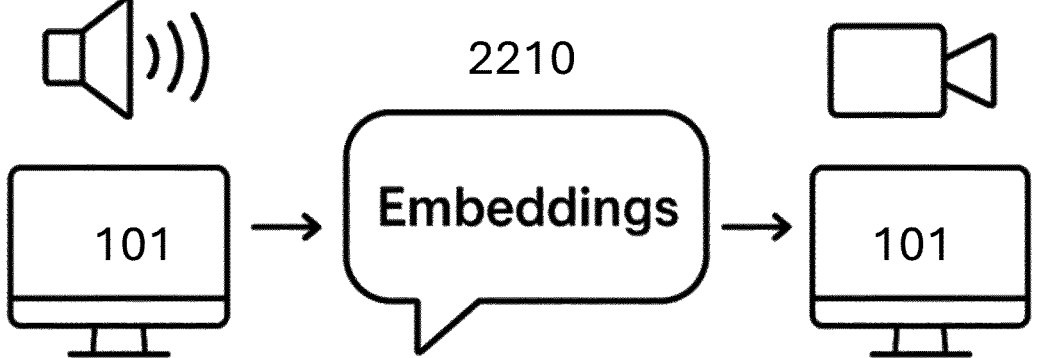

FIG. 8 is a schematic illustration of one embodiment method of inferences are made collaboratively across multiple decentralized edge devices without exchanging raw data.

DETAILED DESCRIPTION

Elements and Labels of the Present Disclosure

101: Audio-Visual Monitoring System/Edge Device

These are edge devices that collect and process both audio and video data, often used for surveillance, healthcare, transportation, and home environments. In most embodiments, they are the Sensors (102) for audio-visual data capture. In some embodiments, they are more than just sensors, including other environmental data from other sources.

102: Sensors

Audio and Visual sensors for capturing raw audio and visual data. In most embodiments, these are the Audio-Visual (audio and visual) Monitoring Systems for audio and visual data capture.

103: Raw audio and visual Data

The unprocessed data stream from the sensors; unprocessed audio and video signals as originally captured by sensors.

104: Buffer/Ring Buffer Memory/Volatile RAM-based Ring Buffer

The secure, short-term volatile memory for temporarily holding raw audio and visual data. A temporary memory buffer (using volatile RAM) that overwrites old data with new data in a continuous loop. Raw audio and visual data is held here before being processed or discarded.

201: Local Processor(s)

The processor(s) of the local computing device that execute the software components.

221: Embedding Generator

The component responsible for converting raw audio/video into multimodal feature vectors using AI models (e.g., transformers, CNNs); the on-device model (e.g., CNN, ViT) that processes raw data into non-reversible embeddings.

2210: Non-Reversible Embeddings/Non-Reconstructable Embeddings

The output of the Embedding Generator; abstract feature vectors. Low-dimensional vector representations of high-dimensional data (like audio or video), designed to capture semantic meaning while being significantly smaller than the original data, and from which the original raw audio-visual data cannot be realistically or meaningfully reverse-engineered.

231: Discard Controller/Discard Engine

The component that manages a volatile buffer and securely deletes raw audio and visual data if no override is triggered; the module that enforces the automatic deletion of raw data from the buffer.

241: Policy Engine

6

The module that defines and interprets the rules (discard policy, override auth). It can be part of a cryptographically enforceable system for temporarily accessing raw data and sending decisions and instructions for permanently deleting it that is secured and verifiable using cryptographic methods.

251: Override Engine

The mechanism that allows temporary, policy-driven access to raw audio and visual data based on specific triggers; the component that receives, authenticates, and acts on override triggers. It can be part of a cryptographically enforceable system.

261: Analysis Module

The component that performs real-time event detection, classification, or alerting solely on the non-reconstructable embeddings.

271: Cryptographic Logging Unit

The module that generates cryptographically signed audit logs. It enables the process of using cryptographic techniques (like hash chaining or blockchain anchoring) to create an immutable and tamper-proof audit trail for events, especially override actions.

2722: Audit Logging unit/Audit Log Entry

The tamper-proof log entries generated by the Cryptographic Logging unit module.

281: Non-Transitory Computer-Readable Medium

The persistent storage for embeddings and logs.

2811: Secure Storage Vault 2811

The encrypted section of persistent storage for retained raw data from overrides.

301: Local Computing Platform/Device/Local Computing Device

The hardware platform (e.g., Jetson, FPGA) on which the system runs.

331: Secure Enclave/TPM 2.0

The hardware security module that protects keys and executes the Policy Engine.

341: FPGA (Field-Programmable Gate Array)

An optional hardware for the embedding model. An integrated circuit configured by a customer or designer after manufacturing, often used for high-performance, low-latency processing.

351: Watchdog Timer

A hardware component linked to the Discard Controller to enforce discarding.

106: Federated Learning Module

A module for coordinating learning across devices using embeddings. Federated Learning is a machine learning approach where models are trained collaboratively across multiple decentralized edge devices without exchanging raw data, and only model updates or embeddings are shared.

107: Alerts a Component for Sending Alerts Via the Protocol.

108: Blockchain Audit Log

A representation of the audit log being anchored to a blockchain. Blockchain Anchoring involves linking cryptographic logs to a distributed ledger technology (like Ethereum or Hyperledger Fabric) to ensure immutability and public verifiability.

In the context of the present disclosure, the following terms are intended to have the meanings assigned below, and such definitions are to be applied consistently throughout the specification and claims.

Local Processing

Processing data directly on the device where it is collected, rather than sending it to a remote server. This includes both on-device processing and processing through a local network.

On-Device

Refers to components and processes physically and logically contained within the edge device itself (e.g., the NVIDIA Jetson, ARM SoC). This is the core innovation zone.

Local/Local Network

The term "local" sometimes refers to the edge device itself ("local computing device") and other times to a local network (e.g., a "local hub" or "private subnet"). "Local Network" is used for the latter meaning to avoid confusion.

Remote

Refers to systems outside the immediate local network, typically cloud servers or data centers accessed over the internet.

Encryption

The process of converting information or data into a code to prevent unauthorized access.

Jetson Orin/Xavier NX

NVIDIA System-on-Chip (SoC) platforms used for edge AI processing, providing high performance for AI inference.

Differential Privacy (DP) Noise

A technique for adding noise to data or embeddings to protect individual privacy while still allowing for aggregate analysis, making it harder to link data back to specific individuals.

HMAC (Hash-Based Message Authentication Code)

A specific type of message authentication code (MAC) involving a cryptographic hash function and a secret cryptographic key, used for data integrity and authentication.

Merkle Tree (Hash Chaining)

A tree structure in which every leaf node is labelled with the cryptographic hash of a data block, and every non-leaf node is labelled with the cryptographic hash of its child nodes' labels. Used for verifying data integrity efficiently.

Federated Inference/Learning

A machine learning approach where models are trained or inferences are made collaboratively across multiple decentralized edge devices without exchanging raw data. Only model updates or embeddings are shared.

Undercomplete Representation

An embedding where the dimensionality of the representation is significantly smaller than the input data, making reconstruction difficult.

L2 Similarity

A measure of the similarity or difference between two vectors, often used in reconstruction resistance to quantify how much a reconstructed image deviates from the original. A low L2 similarity (e.g., <1%) indicates high reconstruction resistance.

White-Box Adversarial Reconstruction

An attack scenario where an adversary has full knowledge of the AI model's architecture and weights and attempts to reconstruct raw data from embeddings.

HIPAA (Health Insurance Portability and Accountability Act)

A US law providing data privacy and security provisions for safeguarding medical information.

GDPR (General Data Protection Regulation)

A comprehensive data protection law in the European Union and European Economic Area.

ISO/IEC 27001

An international standard for information security management systems.

In a first aspect of the present invention, a method for privacy-preserving processing of audio-video data is described.

A first step is capturing, via at least one sensor 102, a stream of raw audio and visual data 103, wherein the sensor 102 is connected to a local computing device.

This first step is achieved through specific hardware and initial processing steps.

Sensors for Audio and Visual Data Capture

In the first step of the method aspect of the present invention, the Audio-Visual (audio and visual) Monitoring Systems utilizes a combination of a plurality of visual sensors and a plurality of audio sensors to continuously capture audio-video (audio and visual) input streams. The plurality of visual sensors may include cameras, while the plurality of audio sensors may include microphones or microphone arrays.

In certain embodiments, one of the plurality of visual sensors comprises a 1080p CMOS sensor operating at 30 frames per second (FPS) with high dynamic range (HDR) support, suitable for general-purpose deployment. In a low-power embodiment, the visual sensor may instead comprise a mono CMOS sensor with 640×480 resolution operating at 15 FPS to conserve power. In a more advanced embodiment intended for use in public spaces, the visual sensor may comprise a 4K wide field-of-view (FOV) RGB camera to support broader environmental coverage.

In further embodiments, one of the plurality of audio sensors comprises a 2-4 channel MEMS microphone array with a 16 kHz sampling rate, providing sufficient fidelity for human speech and ambient sound detection. In a low-power embodiment, the audio input may be captured by a single MEMS microphone, while in transportation hub or high-traffic embodiments, the system may employ a directional microphone array also operating at 16 kHz to capture targeted sound sources.

The plurality of video and audio sensors are designed to capture both human-related signals (e.g., indicators of distress, falls, or aggressive behavior) and environmental signals (e.g., animal sounds such as a dog barking), enabling the AI models to detect a wide variety of multimodal events without necessarily filtering out non-human-related content.

For particular use-case scenarios and by way of example, different visual sensors are selected for different use case scenarios. In an elder care embodiment, a wide-angle camera capturing at 15-30 FPS and a multi-mic array for location estimation may be use. For a driver monitoring system, a near-infrared camera compliant with Euro NCAP at 30 FPS is utilized. For a private room, in a low-power, private setting, an infrared camera at 10 FPS and a single 8 kHz microphone may be employed to minimize intrusiveness and power consumption.

Local Computing Device and Connectivity

The plurality of video and audio sensors are operatively connected to a local computing device 301, which is associated to the same edge device 101 configured for real-time processing of audio and visual data.

In a primary embodiment, the local computing device comprises an NVIDIA Jetson Orin NX or Xavier NX system-on-chip (SoC), which provides sufficient computational resources to execute the on-device AI embedding model and other complex processing tasks.

In a low-power embodiment, the local computing device may comprise a lightweight mobile processor, such as an ARM Cortex-A55 SoC integrated with a 1 tera-operations-per-second (TOPS) neural processing unit (NPU) (e.g., Rockchip RK3566). Such a configuration supports portable, wearable, or in-vehicle use cases where power efficiency is critical.

The local computing device may further comprise network connectivity, including wired interfaces such as Gigabit Ethernet or wireless interfaces such as Wi-Fi 6. Importantly, in normal operation, no raw audio and visual data 103 is transmitted off the device, thereby ensuring privacy preservation by default.

Initial Handling of Raw Data 103

Following capture, the raw audio and visual input streams are temporarily stored in a volatile random-access memory (RAM)-based ring buffer 104.

In certain embodiments, the buffer size is approximately 500 milliseconds, for example in the range of 200 to 800 milliseconds. In a low-power embodiment, the buffer may be shorter, such as 256 milliseconds, to minimize memory and power usage. In a task-specific embodiment, the buffer size may be customized, to balance memory and power usage with the purpose of the task mission. In an environment-sensitive embodiment, a selective size of buffer may be designed.

In an advanced embodiment, the buffer size can be dynamically adjusted based on needs.

This temporary storage step is distinct from persistent storage and is regarded as a "disposal process" for the raw data, wherein the data is placed into the ring buffer 104 only as a precursor to either permanent deletion or, under specific override conditions, secure retention. The buffer 104 is not meant for storage, is meant for preparation for disposal.

The raw audio and visual data 103 is never persistently stored in a local media or transmitted to a cloud server under default operation. Instead, the system implements discard logic as a fundamental privacy-by-design feature. In the absence of a valid policy-based override, the discard logic ensures that raw audio and visual data 103 is securely deleted from volatile memory once the buffer window has expired, thereby preventing unauthorized retention or transmission of sensitive content.

In the first aspect of the present invention, second step is processing the stream of raw audio and visual data 103 using an on-device embedding model to generate one or more non-reversible, task-specific multimodal embeddings 2210, wherein the one or more embeddings 2210 comprises pattern-recognition feature vectors, are abstract representations of features within the raw audio and visual data, and are incapable of being used to reconstruct the raw audio and visual data.

The second step is implemented through a combination of advanced AI models, privacy-enhancing transformations, and architectural safeguards.

A principal purpose of generating multimodal embeddings 2210 in the present invention is to enable AI-based event analysis while strictly preventing reconstruction of raw audio-visual (audio and visual) signals. By discarding raw audio and visual data and utilizing only non-reconstructable embeddings, the system addresses critical privacy concerns in sensitive environments. In particular, the system does not store or transmit raw audio and visual data under normal operation, thereby ensuring privacy-by-design.

On-Device Embedding Model and Architecture

In one variation, the embedding model is executed entirely on the local computing device in the edge device 101, thereby ensuring that no raw audio and visual data is transmitted off the device. The embedding model comprises separate audio and video processing pathways, which are fused to produce task-specific multimodal embeddings.

Visual Pathway. In certain embodiments, visual input is processed using EfficientNet-Lite or Vision Transformer (ViT)-based convolutional neural networks (CNNs), generating a 1024-dimensional feature vector. This pathway is configured to capture spatiotemporal structure, motion, posture, and facial state, and outputs a 768-dimensional video embedding. In a low-power embodiment, the visual input is processed by a MobileNetV2 network trained with pruning and quantization, producing a 256-dimensional embedding vector. In a federated learning module embodiment, spatiotemporal encoding using a ViViT model generates 1024-dimensional visual embeddings. In a cloud-cooperative embodiment, an FPGA accelerator 341 performs real-time semantic segmentation and per-region feature extraction using YOLO-NAS or EfficientNet, producing 2048-dimensional region feature vectors.

Audio Pathway. In certain embodiments, audio is preprocessed through noise suppression and Fast Fourier Transform (FFT) to generate spectrograms, which are processed by a CNN-RNN hybrid model to generate a 512-dimensional embedding vector. This captures audio features such as emotion, speech tone, and background context. In a low-power embodiment, audio is preprocessed into Mel-frequency cepstral coefficients (MFCCs) and embedded using a 4-layer CNN, producing a 128-dimensional vector. In a federated learning module embodiment, log-Mel spectrograms are processed with a long short-term memory (LSTM) model to produce 512-dimensional embeddings. In a cloud-cooperative embodiment, embeddings capture speech and ambient cues such as whispers and shouting, yielding 512-dimensional vectors.

Multimodal Fusion. In certain embodiments, the separate audio and video embeddings are fused using a multimodal fusion module. Fusion typically employs an attention-based alignment mechanism to synchronize temporal signals. In a primary embodiment, the fused 1280-dimensional vector is compressed to 768 dimensions using a learned linear projection layer. In a low-power embodiment, the fused audio and visual embeddings are reduced to a 384-dimensional vector and further compressed to 256 dimensions using either principal component analysis (PCA) or a learned projection. In federated learning module and cloud-cooperative embodiments, Transformer encoders or spatio-temporal Transformer networks are employed for fusion, generating 1024-dimensional embeddings, or in certain public-space embodiments, 3072 -dimensional vectors compressed to 1024 dimensions. The number of the dimensional are listed for example purpose, shall not interpreted as a limitation.

Non-Reversible Transformation (Non-Reconstruct-Ability)

The present invention employs multiple mechanisms to ensure that generated embeddings are non-reconstructable, meaning they cannot be used to reconstruct directly or indirectly back to the raw audio and visual data.

In certain embodiments, the embedding model imposes a dimensional bottleneck or undercomplete representation, wherein raw signals comprising millions of pixels or wave samples are reduced to relatively low-dimensional vectors (e.g., 256 dimensions or 256D, 768 dimensions or 768D, 1024 dimensions or 1024D). This reduction makes reconstruction mathematically under constrained.

In an alternative embodiment, the encoding process deliberately destroys critical details of the raw signals, particularly through transformer-based encoding, ensuring irreversible information loss. Said critical details are selected from phase and magnitude.

In additional embodiments, embeddings are further subjected to cryptographic transformations, such as hashing with HMAC and salting, or one-way hashing using SHA- 256. These transformations both secure the integrity of the embeddings and render reconstruction infeasible.

In additional alternative embodiments, the Privacy-Preserving Audio-Visual Processing system of the present invention applies differential privacy noise injection (e.g., with privacy budgets ε=2.0 or ε=1.5), further obfuscating the data and protecting against reconstruction or membership inference attacks.

In yet further embodiments, the system prevents access to encoder weights of the embedding model, either by obfuscating the weights or securing them within hardware-protected modules, thereby eliminating the possibility of adversarial reconstruction through encoder inversion.

In still further embodiments, immediately after embedding generation, the raw audio and visual data is retained in the volatile RAM-based ring buffer 104 only for a short duration (e.g., less than 500 milliseconds, or 256 milliseconds in low-power embodiments). The data is then securely zeroed out if no override is triggered, ensuring raw content is never retained.

Empirical validation of the present invention establishes that, by using at least one of the foregoing mechanisms, under white-box adversarial conditions—including, but not limited to, reconstruction attempts employing generative adversarial networks (GANs) and autoencoder-based models—the recovered signals exhibit less than 1% L2 similarity and less than 5% correlation relative to the corresponding original signals. Accordingly, the validation confirms that the disclosed architecture renders recovery of identifiable content infeasible.

Task-Specific Multimodal Embeddings (Pattern-Recognition Feature Vectors)

In one aspect, the term "embedding" refers to an abstract numerical vector generated by the system to represent features of the raw audio and visual data. These embeddings are not simple compressed versions of the raw signals but are instead task-specific semantic representations generated by deep learning models.

In certain embodiments, the embeddings preserve semantic cues relevant to downstream AI analysis through analysis module 261 while being non-reconstructable. The features encoded may include motion, posture, facial state, emotion, speech tone, background context, or higher-level constructs such as intent or event categories.

In further embodiments, the embeddings are provided as input to an on-device inference engine for real-time event detection, classification, or alerting. Example applications include anomaly detection (e.g., pacing, falls, self-injury gestures), speech event detection (e.g., crying, yelling), and contextual alerts (e.g., unexpected motion during restricted times).

In some embodiments, Empirical data show that the task-specific embeddings achieve high inference accuracy, with benchmarks indicating retention of greater than 92% accuracy compared to models operating directly on raw data, with an accuracy delta of approximately—3.5%. Such performance demonstrates the feasibility of privacy-first design while preserving analytical utility.

For particular use case scenario and by way of example, for a Mental Health Room, in order to better detect self-injury motions, a lightweight Transformer for video (generating a 768D embedding) fused with a CNN-RNN hybrid for audio (512D embedding) via a 3-head attention model is effective.

For an Office Boardroom, in order to better detect keyword, a Vision Transformer (ViT) for video can be combined with a deep audio model for speech tone, fused into a 1024D embedding.

In the first aspect of the present invention, a third step is storing and disposing the raw audio and visual data in a secure, short-term ring buffer memory of the computing device; and based on a first policy, automatically discarding the raw audio and visual data from the ring buffer memory within 400 to 800 milliseconds of capture.

In one embodiment, the system implements a short-term storage mechanism for raw audio-visual (audio and visual) data through the use of a secure, volatile ring buffer memory. The operation begins with continuous capture of audio and visual input streams, such as a 30 frames-per-second video feed and synchronized stereo audio. The captured raw audio and visual signals are written into a volatile, RAM-based ring buffer, which is specifically configured for short-term retention. By design, this buffer maintains the raw audio and visual content for only a limited duration. In a primary embodiment, the buffer duration is approximately 500 milliseconds, with some implementations discarding the data in less than 500 milliseconds. In alternative embodiments optimized for low-power edge devices 101, the buffer duration may be shortened further, such as a rolling 256 millisecond RAM buffer. In general, the system ensures that all raw audio and visual data is discarded within 400 to 800 milliseconds of capture.

To protect against tampering or unauthorized access, the ring buffer 104 may be operated in conjunction with enhanced security measures. For example, the buffer 104 may be isolated within a secure enclave or protected by a Trusted Platform Module (TPM 2.0) that enforces access controls and resists physical compromise. In federated or multi-camera deployments, the buffer contents may additionally be encrypted using a selective configuration, further restricting the possibility of raw data persistence or exfiltration.

Once the raw audio and visual data is captured in the buffer, the system immediately performs preprocessing and feature extraction operations, which produce non-reconstructible embeddings of the original signals. These embeddings are designed such that the raw signals cannot be reconstructed therefrom, thereby preserving privacy while still enabling downstream AI analysis. After such preprocessing is complete, the raw audio and visual data is subject to automatic discard under the control of a policy-driven mechanism.

Specifically, a discard controller 231 is provided to enforce a first policy governing retention and deletion of raw audio and visual data. Unless a policy-defined override condition is triggered, the discard controller 231 ensures that the raw buffer contents are securely cleared. The mechanism of discard is implemented using secure memory clearing functions; for example, in some implementations the buffer is wiped using a memzero( ) function. This process actively zeroes the relevant RAM locations, guaranteeing that the raw audio and visual data cannot be recovered once discarded.

The policy engine defines the timing and conditions of discard, as well as the permissible retention of embeddings. The "first policy" thus specifies that raw audio and visual data must be deleted automatically within the aforementioned time interval, absent an explicit override. In some embodiments, the discard process is further enforced by hardware. For instance, a watchdog (WDOG) timer 351 may be employed to guarantee discard even if the software subsystem fails or hangs. The watchdog acts as a hardware timer that forces clearing of the buffer unless it is explicitly reset, thereby binding the software-controlled discard process to a hardware safeguard.

A core principle of the described system is the exclusion of raw audio and visual data from transmission or persistent storage. Under normal operation, no raw audio and visual data is ever written to non-volatile media or transmitted off-device. Only the non-reconstructible embeddings are retained in a non-transitory computer-readable medium 281 for further analysis. This architectural constraint directly addresses privacy concerns, as it ensures that the system never exposes raw, identifiable audio and visual signals beyond the transient and secure confines of the volatile buffer.

In accordance with the aspect of the present invention, the discard delay is configurable to the use case scenario. The configurable discard delay is typically between 300-800 ms. For example, a low-power home robot may use a 300 ms buffer, while a complex retail store setup may use a 600 ms buffer to allow for more processing time. For a factory robot, in a high-vibration environment, the discard logic is enforced by a hardware watchdog timer linked to the system's MCU to guarantee deletion even in the event of a physical shock.

In the first aspect of the present invention, a fourth step is retaining the one or more non-reversible embeddings in a non-transitory computer-readable medium after the raw audio and visual data has been discarded.
Retention of Non-Reversible Embeddings in a Non-Transitory Computer-Readable Medium In one embodiment, the system implements a privacy-preserving pipeline in which raw audio-visual (audio and visual) data is ephemeral and is retained only for the minimal duration necessary to generate one or more non-reversible embeddings. Once generated, these embeddings, rather than the raw audio and visual data, form the persistent representation that may be conditionally retained in a non-transitory computer-readable medium.
Generation of Non-Reversible Embeddings While the raw audio and visual data resides in the buffer, the system employs a deep learning pipeline to generate embeddings. These embeddings are abstract, highly compressed digital feature vectors that encode semantic information derived from the original audio and visual signals. The embeddings are intentionally constructed to be non-reconstructable and non-invertible, achieved through several techniques:
Embodiment of Privacy-Preserving Embedding Generation In one embodiment, while the raw audio-visual (audio and visual) data resides in the volatile buffer, the system employs a deep learning pipeline to generate embeddings. These embeddings serve as abstract, highly compressed digital feature vectors that encode semantic information derived from the original audio and visual signals. The embeddings are intentionally constructed to be non-reconstructable and non-invertible, thereby preserving privacy of the underlying raw data.

In a variation of this embodiment, the system enforces a dimensional bottleneck within the embedding generation pipeline. In this approach, millions of raw pixel or waveform samples are mapped into a significantly lower-dimensional vector space. For example, an input comprising more than two million pixels may be encoded into a 1024-dimensional embedding vector. This reduction discards fine-grained detail, limiting the potential for reconstruction.

In another variation of this embodiment, transformer-based encoding is employed to further obfuscate the raw signals. Specifically, phase and magnitude information critical for reconstruction is intentionally destroyed during encoding. This variation ensures that embeddings retain semantic content for AI analysis while eliminating essential parameters needed to reconstruct the original audio and visual data.

In a further variation of this embodiment, the system applies cryptographic hashing, such as a keyed HMAC with a salted key, to the generated embeddings. Optionally, differential privacy noise, for instance Gaussian or Laplacian perturbations, may be added to the embedding vectors. This variation further reduces the ability of an adversary to infer or reconstruct the raw audio and visual signals from the embeddings.

In yet another variation of this embodiment, access to the encoder's trained weights is strictly restricted. By preventing exposure of the model parameters, the system mitigates risks of model inversion attacks and reinforces the non-invertibility of the embeddings.

In one example of this embodiment, in a clinical monitoring embodiment, raw video frames of a patient are temporarily captured in the ring buffer. The deep learning pipeline converts these frames into a 1024-dimensional embedding vector, destroys phase and magnitude information, applies HMAC hashing with optional Gaussian noise, and secures the encoder weights. The resulting embedding enables downstream event detection without allowing reconstruction of the original video frames.
Conditional Retention in Non-Transitory Medium Only the embeddings generated through this process are candidates for retention beyond the discard interval of the raw audio and visual data. The overarching principle is that raw audio and visual signals are never transmitted from the device or stored in persistent memory during normal operation. Instead, retention of embeddings is governed by policy conditions.

For example, if downstream AI analysis detects a relevant event—such as a fall, a distress signal, or a motion anomaly—the associated embeddings may be selectively retained. Conversely, if no effective event is detected, the embeddings themselves may also be discarded. For those embeddings or derivative event data that are retained, storage is performed in a non-transitory computer-readable medium, subject to encryption and policy rules. In one embodiment for low-power edge devices 101, a one-second event window comprising embeddings is stored locally in encrypted flash memory using AES-GCM. In another embodiment, embeddings are employed in real-time inference or federated learning module 106 scenarios, where they may be transmitted securely to a local hub or private subnet for cross-device aggregation. In a cloud-cooperative embodiment, the embeddings are signed, HMAC-protected, and transmitted over HTTPS to a cloud inference engine. Importantly, in such configurations, the cloud server processes only the embeddings and never reconstructs or renders the original audio and visual content.

In the first aspect of the present invention, a fifth step is receiving an override trigger signal from an override component; in response to receiving the override trigger signal, suspending the first policy to allow controlled access to the raw audio and visual data stored in the ring buffer memory.
Override Trigger and Controlled Access to Raw Audio and Visual Data In one embodiment, the system provides a mechanism for controlled access to raw audio-visual (audio and visual) data retained in the short-term buffer, notwithstanding the default policy of automatic discard. This mechanism is policy-driven, cryptographically secured, and designed to ensure that temporary access to raw audio and visual signals can be authorized only under specific, auditable circumstances.

Receiving an Override Trigger Signal

The system incorporates an Override Engine 251, also referred to as Override Logic, that continuously listens for override trigger signals. Such signals may originate from a variety of sources depending on the deployment context. In a clinical environment, the override may be initiated by a nurse through a tablet interface secured with fingerprint authentication. In other embodiments, the override may be invoked by a spoken command, such as an emergency phrase, detected and validated by the system's speech recognition pipeline. Gesture-based triggers, such as a rapid hand wave combined with positive facial recognition, are also contemplated. Remote override signals may be delivered via an authenticated application programming interface (API) that requires two-factor authentication. For low-power edge devices 101, a physical trigger such as a wall-mounted emergency button may be provided. In federated multi-camera deployments, an authorized staff member may initiate an override through a central dashboard interface. In transportation or other public safety contexts, an incident management command may serve as the override trigger. The system may also apply a policy-defined "emergency rule", whereby detection of certain critical events automatically generates an override signal. Each of these mechanisms functions as a policy-sanctioned exception to the default privacy-preserving discard behavior.

Suspension of the First Policy

The system's first policy defines the automatic discarding of raw audio and visual data from the ring buffer within a short, bounded interval (e.g., 400-800 milliseconds, with a default of 500 milliseconds). Upon receiving a valid override trigger, the discard controller 231 suspends application of this first policy. In effect, the system is configured to discard by default unless an authorized override is detected. When the override signal is validated, the default discard operation is paused, thereby allowing retention of the raw audio and visual data beyond the otherwise enforced interval.

Controlled Access to Raw Audio and Visual Data

Once the first policy is suspended, the system enforces a series of security and accountability measures to govern temporary access to raw audio and visual data.

Temporary Buffer Retention: The system retains a limited duration of raw audio and visual data surrounding the event. In one embodiment, this consists of approximately five seconds of data preceding the trigger and five seconds following it. In a cloud-cooperative configuration, retention may extend up to ten seconds.

Encryption: The temporarily retained data is immediately encrypted using strong encryption standards, such as AES-256.

Secure Storage: The encrypted raw data is written to a sealed storage vault. For low-power edge devices 101, this may consist of a one-second event window stored in encrypted flash memory, employing AES-GCM for confidentiality and integrity.

Access Control: Access to the retained data is strictly policy-gated. Each access attempt is timestamped and associated with a specific override reason. In portable device embodiments, access may be mediated through biometric authentication and HMAC-validated audit logs. In federated deployments, access rights may be linked to enterprise identity management systems, such as LDAP or single sign-on (SSO) tokens. In cloud-cooperative embodiments, decryption of the buffer requires satisfaction of multiple policy checks, including biometric and multi-factor authentication by an authorized incident manager.

Cryptographic Audit Logging unit: Every override event is subject to comprehensive and tamper-resistant Logging unit. Event details such as user identity, timestamp, override reason, and action taken are recorded in a structured log, for example, JSON format. To prevent tampering, logs may be hash-chained using a Merkle tree structure. In some embodiments, every Nth log entry is anchored to an immutable ledger, such as a blockchain 108 (e.g., Ethereum, Hyperledger, or IPFS). This ensures that any attempt to alter or conceal access events is detectable, thereby providing strong accountability and transparency.

Hardware-Level Security: The ring buffer itself may be isolated within a secure enclave 331 or implemented in conjunction with a Trusted Platform Module (TPM 2.0) 331. This provides hardware-level tamper resistance and ensures that even during override conditions, access to raw audio and visual signals remains confined to trusted execution environments.

Under certain use case scenarios, and by way of example, in a mental health monitoring room, the authenticated override may be implemented through one or more mechanisms. In one example, the override may be initiated via a manual trigger executed on a nurse's tablet, wherein access to the tablet requires multi-factor authentication such as a biometric credential in combination with a personal identification number (PIN). In another example, the override may be initiated through a gesture-based input, such as a recognized hand wave in combination with gaze detection toward a designated sensor. In a further example, the override may be initiated by a spoken voice command, such as an "emergency review" command, that is verified through a speech recognition system configured to authenticate the speaker.

In a ride-sharing environment, the override may likewise be triggered through multiple mechanisms. In one example, the override may be initiated by a passenger voice command, such as a command to "record issue," that is processed by the on-device audio recognition module. In another example, the override may be triggered by an application programming interface (API) call issued from a fleet control center to the vehicle system, wherein the API call is authenticated and verified prior to execution.

In the first aspect of the present invention, a sixth step is generating a cryptographically signed audit log entry documenting the override trigger signal and the controlled access to the raw audio and visual data.

Cryptographically Signed Audit Logging Unit of Override Events

In one embodiment, the system ensures accountability and transparency of override operations through the generation of cryptographic Logging unit 271. These entries document both the receipt of an override trigger signal and the subsequent controlled access to raw audio-visual (audio and visual) data. The Logging unit mechanism integrates policy enforcement, secure cryptographic techniques, and tamper-resistant storage structures to produce an immutable and verifiable record of all override events.

Triggering the Log Entry

The audit log entry 2722 is automatically generated whenever the system receives a valid override trigger signal. Such signals may originate from a variety of override components depending on the deployment environment. For example, in a clinical application the signal may be initiated via a nurse's tablet authenticated by fingerprint; in other implementations the signal may derive from a voice command such as "emergency override," a rapid hand gesture validated by face detection, a remote API call requiring two-factor authentication, or a physical wall-mounted override button in a low-power edge device 101. In federated multi-camera systems, the signal may originate from a staff-initiated command entered through a centralized dashboard interface. Upon receipt and authentication of the override trigger, the system suspends enforcement of the first policy—namely, the automatic discard of raw audio and visual data within the buffer—and enables temporary and controlled access to the otherwise transient raw audio and visual signals.

Content of the Audit Log Entry

Each override event is comprehensively documented in a structured data format. In one embodiment, the event record is encoded in a JSON structure to facilitate portability and machine-readability. The entry includes critical metadata such as the identity of the authorized user initiating the override, the timestamp of the event, the specific reason for the override, and the nature of the action taken. By way of example, a representative log entry may contain the fields "override": true, "user": "nurse_1357", "time": "2025-06-17T04: 30Z", "reason": "fall confirmed", and "buffer_retained": "10s". These data elements together provide a complete and auditable record of the override transaction.

Cryptographic Signing and Tamper-Proofing

To ensure the immutability of audit records, each entry is cryptographically signed and incorporated into a tamper-proof log chain. In one embodiment, each entry is hashed using a secure hashing algorithm, such as SHA-256, and subsequently linked via a Merkle tree structure. By incorporating the hash of each preceding entry into the hash of the next, the system ensures that any modification to prior records would invalidate the integrity of the entire chain.

For enhanced decentralization and resilience, selected audit log entries—such as every Nth entry or those generated on an hourly basis—may also be anchored to a distributed ledger technology (DLT) such as Ethereum, Hyperledger Fabric, or IPFS. This anchoring provides an immutable, externally verifiable reference point that renders any attempt to alter or suppress override logs both detectable and practically infeasible.

Additional cryptographic mechanisms may be employed for device-level integrity. For example, in portable device embodiments, audit logs may be validated through HMAC (hash-based message authentication code) signing, with rolling cryptographic keys. In cloud-cooperative embodiments, both embeddings and their associated logs are cryptographically signed and HMAC-validated to preserve integrity across distributed components of the system.

Controlled Access and Accountability

Following the override, the raw audio and visual buffer is retained only for a limited duration, and any retained content is encrypted using robust encryption standards such as AES-256 before being stored in a sealed local vault or secure enclave. Access to this encrypted buffer requires explicit authentication, typically combining biometric verification with multi-factor credentials, and is further gated by policy checks to ensure appropriateness of access. Each decryption or access attempt is timestamped and cross-referenced with the corresponding audit log entry to maintain accountability.

Through this process, the system ensures that while override operations provide the flexibility to temporarily access raw audio and visual data under authorized conditions, such access is tightly controlled, time-limited, and comprehensively recorded in a tamper-resistant manner. The combination of automatic discard logic, policy-driven override, and cryptographic audit Logging unit creates a privacy-preserving architecture that resists misuse, ensures transparency, and establishes a verifiable trail of accountability.

Under certain use case scenarios and by way of example, for relative simpler embodiment, logs may be hashed using SHA-256 and stored in an immutable on-device structure. For an elder care facility or a mental health room, the override events may be logged in a JSON format and made tamper-proof via a Merkle tree structure, with a blockchain anchor committed per 8-hour shift.

EXAMPLE

Senior Care Center

One implementation of the privacy-preserving audio-visual (audio and visual) processing system is senior care center. The implementation further supports a true edge-to-edge federation, wherein individual nodes, sensor devices, collaborate directly for inference without compromising privacy by transmitting raw audio and visual data. This capability is enabled by a defined architecture and a set of associated mechanisms and protocols.

In one embodiment, the edge-to-edge federation is deployed in a senior care facility, where comprehensive, privacy-preserving monitoring is required across multiple rooms. In such a facility, a plurality of networked edge devices 101, for example Jetson Xavier NX nodes, may be installed, with one device typically assigned per room. Each device is equipped with sensors (102), both a visual sensor and a microphone array. A need for collaborative inference arises in situations where events span multiple physical spaces or require contextual understanding beyond the scope of a single device. For instance, when an individual experiences a fall in one room and subsequently moves to another room, or when patterns of wandering behavior extend across multiple monitored areas, the system benefits from direct collaboration between nodes. This distributed approach enables facility-wide monitoring while ensuring that raw audio and visual signals remain confined to the originating device, thus maintaining strict adherence to privacy principles.

The mechanism by which these nodes collaborate relies upon cross-device embedding stream sharing, which is a distinguishing feature of the present invention. Each node initially performs local capture and preprocessing of raw audio and visual signals, such as histogram equalization of video streams and noise suppression of audio streams. The preprocessed data is then provided to an embedding generator 221, which may include a transformer-based encoder for video inputs and a spectrogram-based encoder for audio inputs. The embedding generator 221 outputs high-dimensional multimodal embeddings, for example, 1024-dimensional vectors in one elder care deployment.

Prior to any sharing, these embeddings are subjected to mandatory privacy transformations. The privacy transformations include application of salted HMAC hashing, dimensional dropout, and injection of differential privacy noise with a budget of $\varepsilon=1.5$. These transformations render the embeddings non-reconstructable with respect to the underlying audio and visual signals and resistant to membership inference or related privacy attacks. Following embedding generation and privacy transformation, the raw audio and visual data residing in the volatile RAM-based ring buffer of the local node is securely erased, typically within approximately 500 milliseconds, thereby preventing both long-term retention and external transmission. Only the transformed embeddings, or model updates derived therefrom, are permitted to be transmitted across nodes for collaborative analysis.

The consolidation of inference results in the edge-to-edge federation is achieved through federated averaging. Each node initially conducts local inference on its transformed embeddings to detect events such as falls or anomalous behavior within its assigned room. Thereafter, the nodes engage in a federated learning procedure to improve the robustness of the system-wide model. In particular, each node trains its local model on its own privacy-preserving embeddings and transmits only its model updates, such as parameter weights or gradients, to a coordinating entity. The coordinator, which may be implemented as another edge node or as a local server residing within the facility, executes an aggregation process in which the received model updates are averaged to form a global model. The global model is then redistributed to the nodes for subsequent rounds of local training. This iterative process enables the system to learn from the collective knowledge of all nodes without exposing the raw audio and visual data or even untransformed embeddings from any individual node.

Through this design, the system achieves consolidated, facility-wide intelligence based upon the distributed contributions of multiple nodes, while upholding its fundamental guarantee that no raw audio and visual data is ever shared beyond the originating device. This architecture and method provide a robust technical advantage over conventional monitoring systems by enabling cross-room event tracking and context-aware reasoning in a federated manner, with formal privacy safeguards built into every stage of the process.

The present invention is characterized by converting raw data to the multimodal embeddings to detect events in privacy-critical environments such as elder care facilities, mental health centers, hospitals, and private residences; classrooms, corporate boardrooms, and retail establishments; public transportation systems, driver monitoring systems, and smart city pedestrian monitoring; and factory, warehouse, and home robotics.

The present invention is additionally characterized by authenticating the first edge device's local computing device via a local network application. The present invention is further characterized by authenticating an override alert through a local computing device via a local or network.

In one instance, the system is deployed in elder care facilities to provide continuous, 24/7 monitoring for resident safety, including detection of falls, repetitive or irregular behavior, cognitive decline, and verbal distress, while preserving resident dignity and ensuring compliance with privacy regulations.

The system employs a wide-angle video sensor configured to operate at 15 to 30 frames per second and a multi-microphone array configured for location estimation of speech and ambient sounds. The raw audiovisual data is processed through a preprocessing stage, wherein the video is filtered using motion detection pre-processing to suppress static background, and the audio stream is subjected to directional filtering and noise suppression to isolate relevant signals.

The feature extraction is performed using human posture analysis and optical flow modeling, with features encoded by a ResNet-based network to generate a 512-dimensional video embedding. In parallel, the audio stream is analyzed using a CNN-LSTM classifier tuned for elderly-specific vocal patterns, producing a 384-dimensional embedding. A temporal fusion engine, implemented using a gated recurrent unit (GRU) or Transformer network, aligns and integrates the audio and video features to produce an 896-dimensional multimodal embedding. This representation is further compressed through a policy-aware cross-modal alignment layer to yield a 512-dimensional joint embedding suitable for inference.

The raw audiovisual data is stored temporarily in encrypted SRAM with a buffer duration of approximately 800 milliseconds. A discard logic module automatically deletes the buffered content unless a policy override is activated. The inference engine operates exclusively on the embeddings, with models specifically tuned to detect fall events, repetitive or abnormal movement, vocal distress, and wandering outside of designated areas.

Deployment in elder care facilities is realized using an NVIDIA Jetson Xavier module or an FPGA-based system-on-chip (SoC), with inference executed entirely on-premise and supported by a battery backup system for reliability.

In some instances, override functionality is provided through a policy engine 241, wherein caregivers may activate an override using a voice command or a wearable device. Upon activation, the system temporarily retains raw audiovisual data in an encrypted buffer, and all override events are logged with metadata including timestamp, user identification, and reason code.

Safety and redundancy are further ensured by cross-modal validation, wherein audio and video embeddings are compared to confirm anomalies prior to generating alerts. The system also provides an adjustable alert confidence threshold to reduce false positives.

Policy modes may be configured according to facility requirements. For example, in a "night mode," no overrides are permitted; in an "emergency mode," only audio-based overrides are enabled; and in an "audit-only mode," the system records and stores audit logs but retains no audio-visual content.

Accordingly, this embodiment provides real-time, privacy-compliant monitoring for elder care units, delivering both safety and regulatory compliance while preventing the transmission or long-term storage of raw audiovisual data.

In the scope of the present invention, a controller, a computer device, a processing unit are all one or more processors. The steps of calculating, analyzing and determining are performed by one or more processors. In the scope of the present invention, audio-visual data includes audio data and/or visual data, where visual data is, for example, video data or image data.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to explain the principles of the invention and its practical applications; they thereby enable others skilled in the art to utilize the invention and various embodiments with various modifications as are suited to the particular use contemplated. It is intended that the following claims and their equivalents define the scope of the invention. While this invention has been described in terms of several preferred embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

The invention claimed is:

1. A method for privacy-preserving processing of audio and video data, the method comprising:

capturing, via at least one sensor, a stream of raw audio and video data, wherein the sensor is connected to a local computing device;

processing the stream of raw audio and video data using an on-device embedding generator to generate one or more non-reversible, task-specific multimodal embeddings, wherein the one or more embeddings comprises pattern-recognition feature vectors;

are abstract representations of features within the raw audio and video data; and are incapable of being used to reconstruct the raw audio and video data;

storing the raw audio and video data in a secure, short-term ring buffer memory of the local computing device;

based on a first policy, automatically discarding the raw audio and video data from the ring buffer within 400 to 800 milliseconds after the foregoing step of the capture;

retaining the one or more non-reversible embeddings in a non-transitory computer-readable medium after the raw audio and video data has been discarded;

upon receiving an override trigger signal from an override engine;

suspending the first policy to allow controlled access to the raw audio and video data stored in the ring buffer; and generating a cryptographically signed audit log entry documenting the override trigger signal and the controlled access to the raw audio and video data.

2. The method of claim 1, wherein processing the stream of raw audio and video data using an on-device embedding generator to generate one or more non-reversible, task-specific multimodal embeddings, further comprising processing the multimodal embeddings to detect events in a privacy-critical environment, including elder care facilities, mental health centers, and hospitals.

3. The method of claim 1, further comprising:

transmitting the one or more non-reversible embeddings to a local processor for inference, while no raw audio and video data is transmitted to the local processor.

4. The method of claim 1, further comprising receiving an authenticated override trigger, including at least one of a gesture, a voice command, or an authenticated API call, to permit temporary storage of the raw audio and video signals in the ring buffer, wherein authentication of the override trigger is verified through a hardware-based mechanism.

5. The method of claim 1, wherein the first policy is enforced by a policy engine executed by a secure enclave or Trusted Platform Module (TPM) of the local computing device.

6. The method of claim 1, wherein automatically discarding the raw audio and video data is enforced by a watchdog service so that the ring buffer storage time is timed and the watchdog service is executed by the one or more processors of the local computing device.

7. The method of claim 1, further comprising applying a privacy-enhancing technique to the one or more non-reversible embeddings prior to retention, wherein the privacy-enhancing technique comprises at least one of: cryptographic hashing or injection of differential privacy noise.

8. The method of claim 1, wherein the cryptographically signed audit log entry is stored in an immutable data structure.

9. The method of claim 1, further comprising encrypting the raw radio and audio data stored in the ring buffer using a key managed by a secure enclave or Trusted Platform Module (TPM) of the local computing device.

10. The method of claim 1, further comprising detecting events that include multimodal indicators, such as sudden loud audio patterns combined with rapid visual motion.

11. The method of claim 1, wherein the one or more non-reversible, task-specific embeddings comprise one or more of:

an intent embedding, an emotion embedding, an audio event embedding, or a visual event embedding, and wherein processing the stream of the raw audio and video data comprising generating a joint embedding vector using a time-aligned fusion layer with attention mechanisms.

12. A system for privacy-preserving processing of audio-video data, the system comprising:

at least one processor of a computing device; and a non-transitory computer-readable storage medium comprising instructions that, when executed by the at least one processor, cause the system to:

capture, via at least one sensor, a stream of raw audio and video data;

process the stream of raw audio and video data using an on-device embedding model to generate one or more non-reversible, task-specific embeddings, wherein the embeddings are abstract feature representations incapable of reconstructing the raw audio and video data;

store the raw audio and video data in a secure, short-term ring buffer of the local computing device;

based on a first policy, automatically discard the raw audio and video data from the ring buffer within a configurable discard delay;

retain the one or more non-reversible embeddings in non-transitory computer-readable medium after the raw audio and video data has been discarded;

upon receiving an override trigger signal from an override component, suspend the first policy to permit controlled access to the raw audio and radio data stored in the ring buffer; and generate a cryptographically signed audit log entry documenting the override trigger signal and the controlled access to the raw audio and radio data.

13. The system of claim 12, wherein the configurable discard delay is between 400 and 800 milliseconds.

14. The system of claim 12, wherein the first policy is enforced by a policy engine executed within a secure enclave or Trusted Platform Module (TPM) of the computing device.

15. The system of claim 12, wherein automatic discarding of the raw AV data is enforced by a watchdog service monitoring a timed buffer that is linked to a hardware component of the computing device.

16. The system of claim 12, wherein the at least one sensor comprises an audio-visual input device including at least one of an RGB camera, a stereo camera, a near-infrared sensor, a thermal imager, or a microphone array.

17. The system of claim 12, wherein the on-device embedding generator is a deep-learning model including at least one of a convolutional neural network (CNN), a Vision Transformer (ViT), or a hybrid CNN-RNN architecture.

18. The system of claim 12, wherein the one or more non-reversible embeddings comprise one or more of:

an intent embedding, an emotion embedding, an audio event embedding, or a visual event embedding, and wherein generating the embeddings comprises producing a joint embedding vector using a time-aligned fusion layer with attention mechanisms.

19. The system of claim 12, wherein the instructions further cause the system to apply a privacy-enhancing technique to the one or more non-reversible embeddings, wherein the privacy-enhancing technique comprises at least one of: a cryptographic hash function or differential privacy noise injection.

20. The system of claim 12, wherein the instructions further cause the system to process the one or more embeddings to detect events in a privacy-critical environment, including elder care, mental health monitoring, or private settings.

21. The system of claim 20, wherein the privacy-critical environment is an elder care facility, and wherein the event detection comprises at least one of: fall detection, repetitive behavior detection, or verbal distress detection.

22. The system of claim 12, wherein the instructions further cause the system to:

perform federated learning or inference by transmitting the one or more non-reversible embeddings to a remote system, wherein no raw audio and video data is transmitted from the local computing device.

23. The system of claim 12, wherein the cryptographically signed audit log entry is stored in an immutable data structure, including at least one of: a Merkle tree or a blockchain ledger.

24. The system of claim 12, wherein the at least one processor is implemented on an edge computing platform including an NVIDIA Jetson platform, an FPGA, or a system-on-chip (SoC).

* * * * *